(12) United States Patent
Li

(10) Patent No.: US 11,099,646 B2
(45) Date of Patent: Aug. 24, 2021

(54) BRAIN-CONTROLLED WEARABLE DISPLAY DEVICE AND BRAIN-CONTROLLED DISPLAY METHOD

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 573 days.

(21) Appl. No.: 16/068,342

(22) PCT Filed: Oct. 27, 2017

(86) PCT No.: PCT/CN2017/108006
§ 371 (c)(1),
(2) Date: Jul. 5, 2018

(87) PCT Pub. No.: WO2018/196311
PCT Pub. Date: Nov. 1, 2018

(65) Prior Publication Data
US 2021/0081043 A1 Mar. 18, 2021

(30) Foreign Application Priority Data
Apr. 28, 2017 (CN) .......................... 201710295483.6

(51) Int. Cl.
*G06F 3/01* (2006.01)
*G02B 27/01* (2006.01)
*G06F 1/16* (2006.01)

(52) U.S. Cl.
CPC ......... *G06F 3/015* (2013.01); *G02B 27/0176* (2013.01); *G06F 1/163* (2013.01)

(58) Field of Classification Search
CPC .... G06F 3/015; G02B 27/017; G02B 27/0176
See application file for complete search history.

(56) References Cited

U.S. PATENT DOCUMENTS

| | | | |
|---|---|---|---|
| 2001/0019371 A1* | 9/2001 | Zavracky | A61B 3/113 349/5 |
| 2013/0208234 A1* | 8/2013 | Lewis | G02C 11/10 351/158 |

(Continued)

FOREIGN PATENT DOCUMENTS

| | | |
|---|---|---|
| CN | 101571748 A | 11/2009 |
| CN | 103543836 A | 1/2014 |

(Continued)

OTHER PUBLICATIONS

International Search Report and Written Opinion issued in International Patent Application No. PCT/CN2017/108006, dated Jan. 25, 2018; with English translation.

(Continued)

*Primary Examiner* — Kent W Chang
*Assistant Examiner* — Chayce R Bibbee
(74) *Attorney, Agent, or Firm* — McDermott Will and Emery LLP

(57) ABSTRACT

A brain-controlled wearable display device includes a display panel, a display control circuit, and a brain control circuit connected with the display control circuit. The brain control circuit is configured to generate a control instruction according to a brain wave, and the display control circuit is configured to control the display panel according to the control instruction.

13 Claims, 4 Drawing Sheets

(56) References Cited

U.S. PATENT DOCUMENTS

| | | | |
|---|---|---|---|
| 2015/0272465 A1* | 10/2015 | Ishii | A61B 5/291 |
| | | | 600/545 |
| 2018/0005441 A1* | 1/2018 | Anderson | G06T 19/006 |
| 2018/0055125 A1 | 3/2018 | Zhao et al. | |
| 2018/0107274 A1 | 4/2018 | Li | |
| 2018/0122339 A1 | 5/2018 | Li | |
| 2019/0204916 A1 | 7/2019 | Li | |

FOREIGN PATENT DOCUMENTS

| | | |
|---|---|---|
| CN | 105105724 A | 12/2015 |
| CN | 105528084 A | 4/2016 |
| CN | 205336410 U | 6/2016 |
| CN | 205485920 U | 8/2016 |
| CN | 106125848 A | 11/2016 |
| CN | 106227354 A | 12/2016 |
| CN | 106406361 A | 2/2017 |
| CN | 106557710 A | 4/2017 |
| WO | 2018233303 A1 | 12/2018 |

OTHER PUBLICATIONS

First Office Action issued in corresponding Chinese Application No. 201710295483.6, dated Nov. 21, 2019, with English translation.
Extended European Search Report dated Jan. 21, 2021 in European Application No. 17882286.2.

* cited by examiner

BRAIN-CONTROLLED WEARABLE DISPLAY DEVICE AND BRAIN-CONTROLLED DISPLAY METHOD

CROSS-REFERENCE TO RELATED APPLICATION

This application is a national phase entry under 35 USC 371 of International Patent Application No. PCT/CN2017/108006 filed on 27 Oct. 2017, which claims priority to Chinese Patent Application No. 201710295483.6, filed on Apr. 28, 2017 and entitled "A BRAIN-CONTROLLED WEARABLE DISPLAY DEVICE AND A BRAIN-CONTROLLED DISPLAY METHOD", which is incorporated herein by reference in its entirety.

TECHNICAL FIELD

The present disclosure relates to the field of intelligent control, and in particular to a brain-controlled wearable display device and a brain-controlled display method.

BACKGROUND

A wearable display device is a portable intelligentized hardware device, and realizes an intelligentized display function mainly through software support, data interaction and cloud interaction.

At present, a common wearable display device is a glasses-type wearable display device or a helmet-mounted wearable display device. When the wearable display device is used, it is controlled via a WIFI or controlled manually so as to display. However, this method of controlling the wearable display device is too complicated to meet the user's need for intelligentized control of the wearable display device.

SUMMARY

The present disclosure provides following technical solutions.

An first aspect of the present disclosure provides a brain-controlled wearable display device, comprising a display panel and a display control circuit; the brain-controlled wearable display device further comprises a brain control circuit connected with the display control circuit, the brain control circuit is configured to generate a control instruction according to a brain wave so that the display control circuit controls the display panel according to the control instruction.

The display panel comprises a transparent display module and a light valve structure disposed at a surface of the transparent display module away from a display surface of the transparent display module; the display control circuit comprises a display drive sub-circuit and a transmittance control sub-circuit; an output terminal of the brain control circuit is connected with an input terminal of the display drive sub-circuit and an input terminal of the transmittance control sub-circuit, an output terminal of the display drive sub-circuit is connected with an input terminal of the transparent display module, an output terminal of the transmittance control sub-circuit is connected with an input terminal of the light valve structure; the control instruction comprises a display control instruction, and the display drive sub-circuit is configured to control the transparent display module according to the display control instruction; and/or the control instruction comprises a transmittance control instruction, and the transmittance control sub-circuit is configured to control a light transmittance of the light valve structure according to the transmittance control instruction.

The display drive sub-circuit comprises a switching sub-circuit, the output terminal of the brain control circuit is connected with an input terminal of the switching sub-circuit, an output terminal of the switching sub-circuit is connected with the input terminal of the transmittance control sub-circuit and the input terminal of the transparent display module; display modes of the transparent display module comprises an AR display mode and a VR display mode; the display control instruction comprises a mode switching control instruction through which the transparent display module is switched into the AR display mode or the VR display mode; the switching sub-circuit is configured to identify the mode switching control instruction to obtain an identification result, and to switch a display mode of the transparent display module according to the identification result; the transmittance control sub-circuit is further configured to control the light transmittance of the light valve structure according to the identification result.

The brain-controlled wearable display device further comprises a hat-type body and a visor frame, the display panel is disposed on the visor frame, and the display control circuit and the brain control circuit are both provided in the hat-type body.

A rotating shaft is provided on the hat-type body, the visor frame is movably connected to the rotating shaft; the visor frame or the rotating shaft is provided with a deflection adjustment component, and the deflection adjustment component is configured to adjust the visor frame or the rotating shaft to control a deflection of the visor frame relative to the hat-type body.

An output terminal of the brain control circuit is connected with an input terminal of the deflection adjustment component; the control instruction comprises a display control instruction, and the display control circuit is configured to control the display panel according to the display control instruction; and/or the control instruction comprises an adjustment control instruction, and the deflection adjustment component is configured to adjust the visor frame or the rotating shaft according to the adjustment control instruction.

An output terminal of the switching sub-circuit is connected with an input terminal of the deflection adjustment component, and the deflection adjustment component adjusts the visor frame or the rotating shaft according to the identification result.

The display drive sub-circuit comprises a brightness control sub-circuit; the output terminal of the brain control circuit is connected with an input terminal of the brightness control sub-circuit, and an output terminal of the brightness control sub-circuit is connected with the transparent display module; the display control instruction comprises a brightness control instruction, and the brightness control sub-circuit is configured to adjust a display brightness of the transparent display module according to the brightness control instruction.

The display drive sub-circuit comprises a switch control sub-circuit; the output terminal of the brain control circuit is connected with an input terminal of the switch control sub-circuit, and an output terminal of the switch control sub-circuit is connected with the transparent display module; the display control instruction comprises a switch control instruction, and the switch control sub-circuit is configured to turn on or turn off the transparent display module according to the switch control instruction.

The brain control circuit comprises a signal detection sub-circuit, a signal analysis sub-circuit and an instruction generation sub-circuit which are provided in the hat-type body; an output terminal of the signal detection sub-circuit is connected to an input terminal of the instruction generation sub-circuit via the signal analysis sub-circuit; an output terminal of the instruction generation sub-circuit is connected with an input terminal of the display control circuit; the signal detection sub-circuit is configured to detect a brain wave signal; the signal analysis sub-circuit is configured to analyze the brain wave signal to obtain brain wave expression information; the instruction generation sub-circuit is configured to generate a control instruction according to the brain wave expression information.

The signal detection sub-circuit comprises a brain electrode and a grounding electrode configured to contact with an ear; the brain electrode is provided on the hat-type body, the brain electrode and the grounding electrode are electrically connected with an input terminal of the signal analysis sub-circuit.

The brain-controlled wearable display device further comprises a solar cell configured to provide power to the display control circuit, the display panel, and a brain control unit circuit, and the solar cell is provided on the outer surface of the hat-type body.

A second aspect of the present disclosure provides a brain-controlled display method applied to the brain-controlled wearable display device provided by the first aspect, and the brain-controlled display method comprises: generating, by a brain control circuit, a control instruction according to a brain wave; and controlling, by a display control circuit, a display panel according to the control instruction.

The brain control circuit comprises a signal detection sub-circuit, a signal analysis sub-circuit and an instruction generation sub-circuit; an output terminal of the signal detection sub-circuit is connected to an input terminal of the instruction generation sub-circuit via the signal analysis sub-circuit; an output terminal of the instruction generation sub-circuit is connected with an input terminal of the display control circuit; generating, by the brain control circuit, the control signal according to the brain brave wave comprises: detecting, by the signal detection sub-circuit, a brain wave signal; analyzing, by the signal analysis sub-circuit, the brain wave signal to obtain brain wave expression information; and generating, by the instruction generation sub-circuit, the control instruction according to the brain wave expression information.

The display panel comprises a transparent display module and a light valve structure disposed on a surface of the transparent display module away from a display surface of the transparent display module; the display control circuit comprises a display drive sub-circuit and a transmittance control sub-circuit; an output terminal of the brain control circuit is connected with an input terminal of the display drive sub-circuit and an input terminal of the transmittance control sub-circuit, an output terminal of the display drive sub-circuit is connected with an input terminal of the transparent display module, and an output terminal of the transmittance control sub-circuit is connected with an input terminal of the light valve structure; controlling, by the display control circuit, the display panel according to the control instruction comprises: controlling, by the display drive sub-circuit, the transparent display module according to a display control instruction included in the control instruction; and/or, controlling, by the transmittance control sub-circuit, a light transmittance of the light valve structure according to a transmittance control instruction included in the control instruction.

The display drive sub-circuit comprises a switching sub-circuit, a visor frame or a rotating shaft is provided with a deflection adjustment component, an output terminal of the switching sub-circuit is connected with an input terminal of the transmittance control sub-circuit, an input terminal of the transparent display module and an input terminal of the deflection adjustment component; display modes of the transparent display module comprises an AR display mode and a VR display mode; controlling, by the display drive sub-circuit, the transparent display module according to the display control instruction comprises: identifying, by the switching sub-circuit, a mode switching control instruction included in the display control instruction to obtain an identification result, and switching, by the switching sub-circuit, a display mode of the transparent display module according to the identification result; controlling, further by the transmittance control sub-circuit, the light transmittance of the light valve structure according to the identification result; adjusting, by the deflection adjustment component, the visor frame or the rotating shaft according to the identification result.

The display drive sub-circuit comprises a brightness control sub-circuit and/or a switch control sub-circuit; the output terminal of the brain control circuit is connected with an input terminal of the brightness control sub-circuit and/or an input terminal of the switch control sub-circuit, an output terminal of the brightness control sub-circuit and/or an output terminal of the switch control sub-circuit are connected with the transparent display module; controlling, by the display drive sub-circuit, the transparent display module according to the display control instruction comprises: adjusting, by the brightness control sub-circuit, a display brightness of the display panel according to a brightness control instruction included in the display control instruction; and/or, turning on or turning off, by the switch control sub-circuit, the transparent display module according to a switch control instruction included in the display control instruction.

BRIEF DESCRIPTION OF THE DRAWINGS

The drawings described herein are provided to provide a further understanding of the present disclosure and form a part of the present disclosure. Exemplary embodiments of the present disclosure and the description thereof are used to explain the present disclosure and do not constitute improper limitations to the present disclosure. In the drawings.

DETAILED DESCRIPTION

In order to further describe a brain-controlled wearable display device and a brain-controlled display method provided in embodiments of the present disclosure, the following will be described in detail with reference to the accompanying drawings of the specification.

Figure 1:
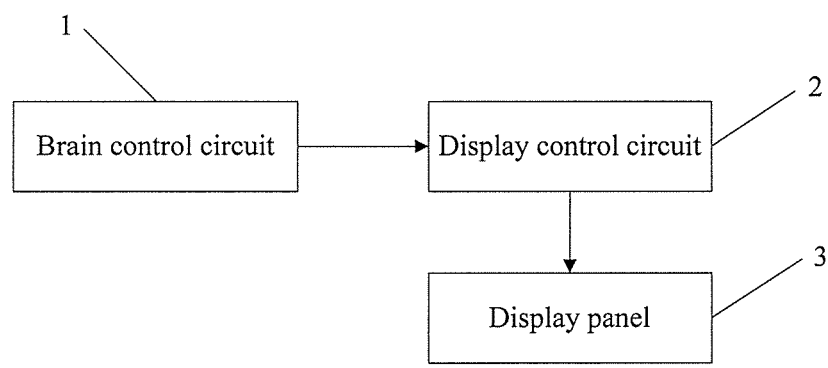
FIG. 1 is a first structural block diagram of a brain-controlled wearable display device provided by an embodiment of the present disclosure.

As shown in FIG. 1, an embodiment of the present disclosure provides a brain-controlled wearable display device. The brain-controlled wearable display device includes a brain control circuit 1, a display control circuit 2 and a display panel 3. The brain control circuit 1 is connected with the display control circuit 2, and configured to generate a control instruction according to a brain wave so that the display control circuit 2 controls the display panel 3 according to the control instruction.

It will be noted that a circuit, a sub-circuit, or the like designed by the present disclosure can be implemented by a circuit, a chip or computer programs stored in a storable device.

A brain-controlled display process realized by the brain-controlled wearable display device provided by the embodiments of the present disclosure will be described in detail with reference to the accompanying drawings.

Figure 6:
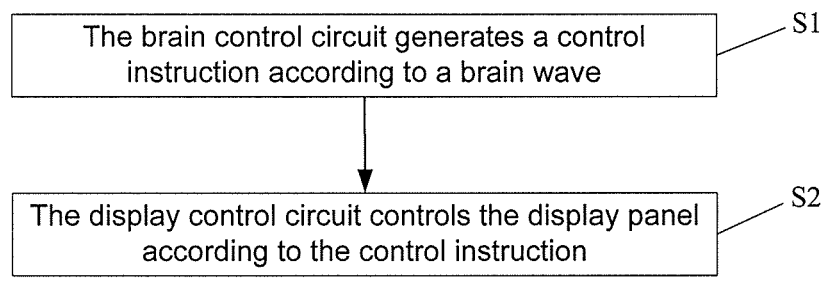
FIG. 6 is a flowchart of a wearable display method provided by an embodiment of the present disclosure.

As shown in FIG. 6, a control method for a brain-controlled wearable display device provided by the embodiments of the present disclosure includes the following steps.

In S1, the brain control circuit 1 generates a control instruction according to a brain wave.

In S2, the display control circuit 2 controls the display panel 3 according to the control instruction.

It can be seen from the control process of the brain-controlled wearable display device provided by the above embodiments that the brain control circuit 1 is connected with the display control circuit 2 so that the display control circuit 2 can control the display panel 3 according to a control instruction after the brain control circuit 1 generates the control instruction according to the brain wave. Therefore, a user can control the brain-controlled wearable display device at any time via the brain wave. In this way, the method for controlling the wearable display device can be simplified, thereby improving the intellectualization of the method for controlling the wearable display device.

Figure 5:
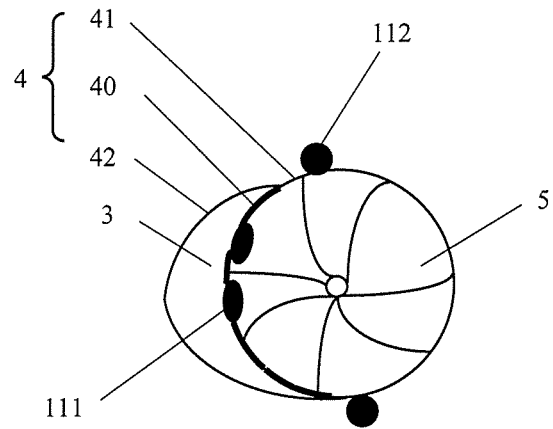
FIG. 5 is an entity structural diagram of a brain-controlled wearable display device provided by an embodiment of the present disclosure.

It will be understood that as shown in FIG. 5, the brain-controlled wearable display device provided by the above embodiments further includes a hat-type structure 4. The shape of the hat-type structure 4 is not particularly limited and can be a circle, a square or other shapes.

Specifically, as shown in FIG. 5, the hat-type structure 4 includes a hat-type body 41 and a visor frame 42. The brain control circuit 1 and the display control circuit 2 are both provided at the hat-type body 41, and the display panel 3 is provided on the visor frame 42, so that the display panel 3 and the visor frame 42 together form a visor. In this way, the display panel 3 can not only achieve the function of blocking the light as a part of the visor, but also enable the display function of the visor via the display panel 3.

Since the brain control circuit 1 and the display control circuit 2 are both provided at the hat-type body 41 and the display panel 3 is provided on the visor frame 42, when the display control circuit 2 is connected with the display panel 3, a problem of the exposure of a guide wire easily occurs. In order to reduce the occurrence of the problem of the exposure of the guide wire, the hat-type body 41 and the visor frame 42 in the above-described embodiments are connected via a rotating shaft 40. An insulating via hole is provided in the rotating shaft 40, so that the guide wire connected the display control circuit 2 with the display panel 3 passes through the insulating via hole of the rotating shaft 40 and is directly connected with the display panel 3. Therefore, the occurrence of the exposure of the guide wire can be reduced.

Figure 2:
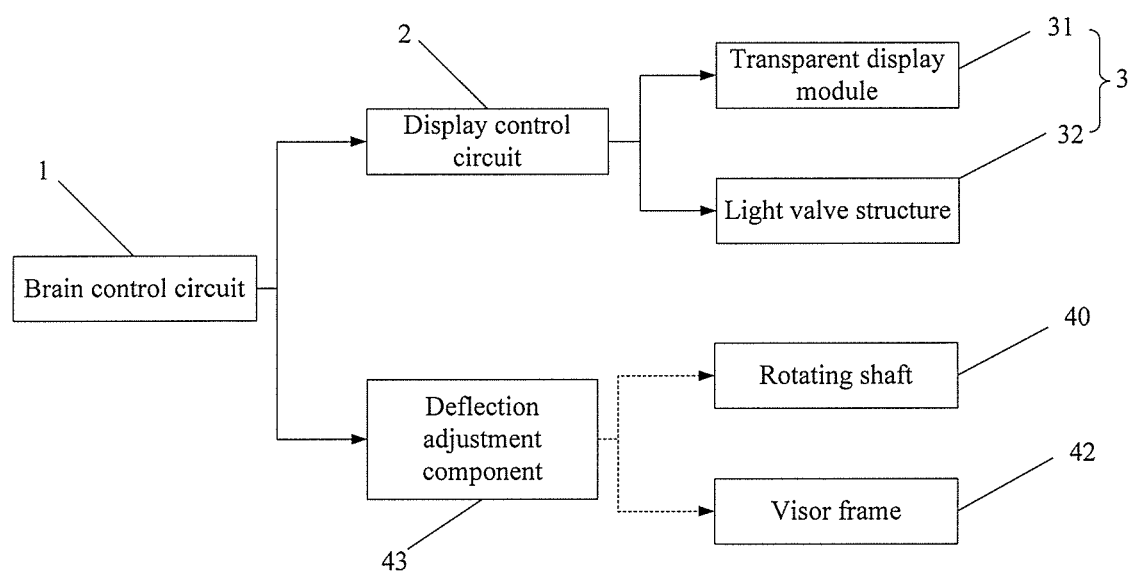
FIG. 2 is a second structural block diagram of a brain-controlled wearable display device provided by another embodiment of the present disclosure.

In order to facilitate the user to view a picture displayed by the display panel 3, the hat-type body 41 is provided with the rotating shaft 40, the visor frame 42 is movably connected with the rotating shaft 40, and the visor frame 42 or the rotating shaft 40 is provided with a deflection adjustment component 43 (not shown in FIG. 5) as shown in FIG. 2. The deflection adjustment component 43 adjusts the visor frame 42 or the rotating shaft 40 to control a deflection of the visor frame 42 relative to the hat-type body 41. In this way, the deflection adjustment component 43 can not only adjust the degree of the deflection of the visor frame 42 relative to the hat-type body 41 according to light intensity so that the visor can be controlled to block light, but also can drive an angle between the display surface of the display panel 3 and the user's line of sight to change after the visor frame 42 is deflected relative to the hat-type body 41. In this way, when the user is inconvenient for viewing, the user can adjust the angle between the display surface of the display panel 3 and the user's line of sight via the deflection adjustment component 43, so as to ensure that the user views the display screen in an optimal manner.

In one embodiment of the present disclosure, in a case that the visor frame 42 is provided with the deflection adjustment component 43 shown in FIG. 2, the visor frame 42 is movably provided on the rotating shaft 40 to ensure that the deflection adjustment component 43 can control the rotation of the visor frame 4 about the rotating shaft 40, so as to ensure that the visor frame 42 is deflected relative to the hat-type body 41 to a certain extent. In this process, the visor frame 42 can drive the display panel 3 provided on the visor frame 42 to rotate about the rotating shaft 40 so that the angle between the display surface of the display panel 3 and the user's line of sight changes. The deflection adjustment component 43 shown in FIG. 2 can be an ordinary mechanical adjustment device, and can also be other intelligently controlled adjustment device.

For example, in a case that the visor frame 42 is provided with the deflection adjustment component 43 as shown in FIG. 2, the deflection adjustment circuit 43 can be a retractable bracket, and a retractable end of the retractable bracket is connected with the visor frame 42. By adjusting a retractable length of the retractable bracket, the deflection of the visor frame 42 relative to the hat-type body 41 can be adjusted, so that the angle between the display surface of the display panel 3 and the user's line of sight changes.

In another embodiment of the present disclosure, in a case that the rotating shaft 40 is provided with the deflection adjustment component 43 shown in FIG. 2, the rotating shaft 40 can be controlled to rotate by the deflection adjustment component 43 so that the rotating shaft 40 drives the visor frame 42 to deflect relative to the hat-type body 41 to a certain extent, thereby ensuring that the angle between the display surface of the display panel 3 and the user's line of sight changes. The deflection adjustment component 43 shown in FIG. 2 can be an ordinary mechanical adjustment device, and can also be another intelligently controlled adjustment device.

For example, in a case that the rotating shaft 40 is provided with the deflection adjustment component 43 shown in FIG. 2, the deflection adjustment component 43 can be a rotation control mechanism. By controlling the rotating shaft 40 by the rotation control mechanism to rotate, the rotating shaft 40 drives the visor frame 42 to rotate, so that the deflection of the visor frame 42 relative to the hat-type body 41 can be adjusted. In this way, it may be ensured that the angle between the display surface of the display panel 3 and the user's line of sight changes.

It will be noted that in the above embodiments, the visor frame 42 is deflected relative to the hat-type body 41 to a certain extent, and a deflecting direction of the visor frame 42 is clockwise or counterclockwise about the rotating shaft.

In consideration of the user's demand, the brain control circuit 1 in the above embodiments can generate a corresponding control instruction in time according to the user's demand, and the control instruction is various. The function implementation of the display control circuit 2 is described below in detail according to situations under different control instructions.

As shown in FIG. 2, in order to enable the deflection adjustment component 43 to intelligently control the visor frame 42 or the rotating shaft 40, in the embodiments, an output terminal of the brain control circuit 1 can also be connected with the deflection adjustment component 43. In this case, when the user needs to control the display panel 3 to display, the control instruction generated by the brain control circuit 1 is a display control instruction or includes the display control instruction. When the user needs to adjust the visor frame 42 or the rotating shaft 40, the control instruction generated by the brain control circuit 1 should be an adjustment control instruction or should include the adjustment control instruction.

In a case that the control instruction includes the display control instruction, the display control circuit 2 is configured to control the display panel 3 according to the display control instruction. In a case that the control instruction includes the adjustment control instruction, the deflection adjustment component 43 is configured to adjust the visor frame 42 or the rotating shaft 40 according to the adjustment control instruction. Since the output terminal of the brain control circuit 1 is connected with the deflection adjustment component 43, when the user needs to control the deflection adjustment component 43 to adjust the visor frame 42 or the rotating shaft 40, the visor frame 42 or the rotating shaft 40 does not need to be manually adjusted via the deflection adjustment component 43. In contrast, the brain control circuit 1 receives the adjustment control instruction for controlling the deflection adjustment component 43 and then sends the adjustment control instruction to the deflection adjustment component 43 so that the deflection adjustment component 43 adjusts the visor frame 42 or the rotating shaft 40. In this way, when the user proposes to adjust the visor frame 42 or the rotating shaft 40, the brain control circuit 1 only needs to be used to convert the user's requirement into an adjustment control instruction, and then the deflection adjustment component 43 can be intelligently controlled to adjust the visor frame 42 or the rotating shaft 40.

It will be understood that if the deflection adjustment component 43 is to receive the adjustment control instruction sent by the brain control circuit 1, the deflection adjustment component 43 should have a control switch, such as a solenoid valve, which can be controlled by a signal, to ensure that the deflection adjustment component 43 can be controlled by an adjustment signal sent by the brain control circuit 1.

Since the display panel 3 in the above embodiments is disposed on the visor frame 42 so that the display panel 3 and the visor frame 42 form a visor with a light-blocking function, in order to enable the visor to have a variety of implementations of light-blocking functions, the display panel 3 in the above embodiments can also be provided as a transparent adjustable display panel. As shown in FIG. 2, the transparent adjustable display panel 3 includes a transparent display module 31 and a light valve structure 32 disposed on a surface of the transparent display module 31 away from the display surface of the transparent display module 31. In this case, when the user needs to control the display panel 3 to display, the control instruction generated by the brain control circuit 1 is the display control instruction or includes the display control instruction. When the user needs to adjust a light transmittance of the display panel 3, the control instruction generated by the brain control circuit 1 is a transmittance control instruction or includes the transmittance control instruction.

Among them, the light valve structure 32 may be a liquid crystal light valve, a grating light valve, or the like.

Specifically, in a case that the control instruction is the display control instruction or includes the display control instruction, the display control circuit 2 is configured to control the transparent display module 31 according to the display control instruction. In a case that the control instruction is the transmittance control instruction or includes the transmittance control instruction, the display control circuit 2 is configured to control the light transmittance of the light valve structure 32 according to the transmittance control instruction. Therefore, when the user needs to adjust the intensity of the light-blocking function of the visor, it is not necessary to use the deflection adjustment component 43 to adjust the rotating shaft 40 or the visor frame 42, but only to convert the user's demand into a corresponding transmittance control instruction via the brain control circuit 1, so that the display control circuit 2 controls the light transmittance of the light valve structure 32 according to the transmittance control instruction so as to ensure the adjustment of the intensity of the light passing through the visor.

Figure 3:
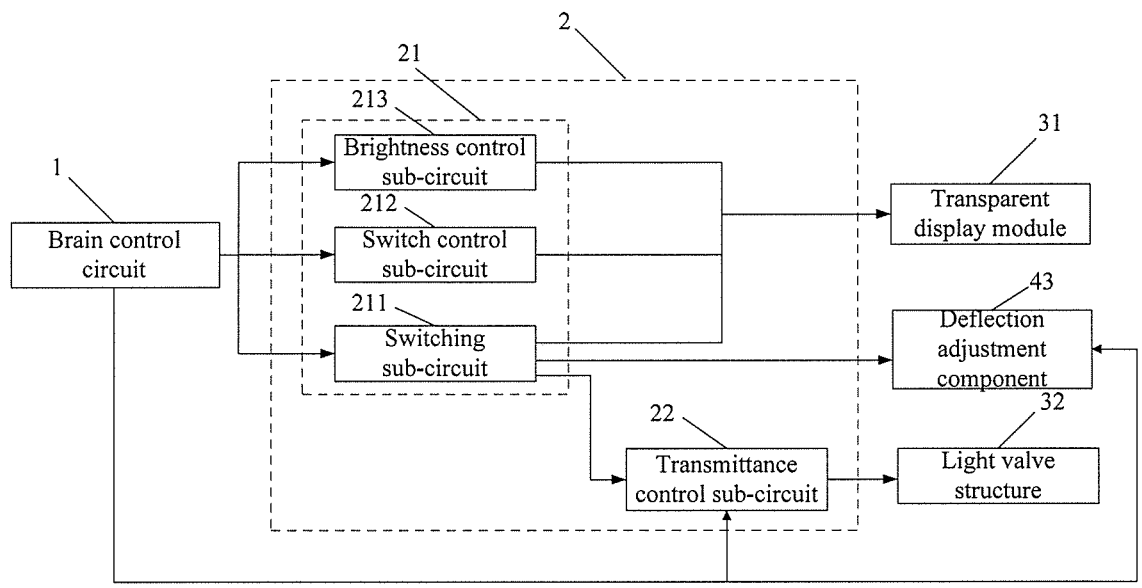
FIG. 3 is a third structural block diagram of a brain-controlled wearable display device provided by still another embodiment of the present disclosure.

It will be understood that the transparent display module 31 in the embodiments may be a transparent OLED (Organic Light-Emitting Diode) display module, may also be a transparent LCD (Liquid Crystal Display) display module, and may also be an ECD (Electrochromic Display) display module. When being the transparent LCD display module, the transparent display module 31 should also include a backlight source provided on a side of the LCD display module to ensure that the LCD display module can display an image. In addition, in a case that the control instruction includes the display control instruction and the transmittance control instruction, as shown in FIG. 3, the display control circuit 2 should have a display drive sub-circuit 21 and a transmittance control sub-circuit 22 that may control the light valve structure 32, and an output terminal of the brain control circuit 1 is connected with input terminals of the display drive sub-circuit 21 and the transmittance control sub-circuit 22. In addition, an output terminal of the display drive sub-circuit 21 is connected with the transparent display module 31, and an output terminal of the transmittance control sub-circuit 22 is connected with an input terminal of the light valve structure 32. In this way, in a case that the control instruction includes the display control instruction, the display drive sub-circuit 21 in the display control circuit 2 can control the transparent display module 31 according to the display control instruction. In a case that the control instruction includes the transmittance control instruction, the transmittance control sub-circuit 22 in the display control circuit 2 is configured to control the light transmittance of the light valve structure 32 according to the transmittance control instruction.

Specifically, the functions implemented by the display drive sub-circuit 21 generally include adjustments of the display brightness, turning-on and turning-off of the transparent display module 31. In this case, if the user needs the display drive sub-circuit 21 to complete these operations, a display operation instruction generated by the brain control circuit 1 should include a brightness control instruction and/or a switch control instruction, and may also be other types of display control instructions.

Specifically, the functions implemented by the display drive sub-circuit 21 generally include adjustments of the display brightness, turning-on and turning-off of the transparent display module. In this case, if the user needs the display drive sub-circuit 21 to complete these operations, a display operation instruction generated by the brain control circuit 1 should include a brightness control instruction and/or a switch control instruction, and may also be other types of display control instructions.

Correspondingly, in one embodiment of the present disclosure, as shown in FIG. 3, the display drive sub-circuit 21 includes a brightness control sub-circuit 213. The output terminal of the brain control circuit 1 is connected with an input terminal of the brightness control sub-circuit 213, and an output terminal of the brightness control sub-circuit 213 is connected with the transparent display module 31.

In a case that the display control instruction is the brightness control instruction or includes the brightness control instruction, the brightness control sub-circuit 213 is configured to adjust the display brightness of the transparent display module 31 according to the brightness control instruction.

In another embodiment of the present disclosure, as shown in FIG. 3, the display drive sub-circuit 21 includes a switch control sub-circuit 212. The output terminal of the brain control circuit 1 is connected with an input terminal of a switch control sub-circuit 212, and an output terminal of the switch control sub-circuit 212 is connected with the transparent display module 31.

In a case that the display control instruction is the switch control instruction or includes the switch control instruction, the switch control sub-circuit 212 is configured to turn on or turn off the transparent display module 31 according to the switch control instruction.

It will be noted here that the functions implemented by the display drive sub-circuit 21 generally include adjustments of the display brightness, turning-on and turning-off of the transparent display module 31. However, in some specific display modules, the display drive sub-circuit 21 may also perform other functions, and a display mode switching function implemented by the display drive sub-circuit 21 when the transparent display module 31 includes two display modes, i.e., an AR display mode and a VR display mode is taken as an example in the following.

In a case that display modes of the transparent display module 31 includes the AR display mode and the VR display mode, the display control instruction in the control instructions generated by the brain control circuit 1 should include a mode switching control instruction, and the mode switching control instruction makes the transparent display module 31 be switched into the AR display mode or the VR display mode. In addition, in a case that the above control instructions include the transmittance control instruction, the transparency of the transparent display module 31 can be changed by controlling the light transmittance of the light valve structure 32 so that the light transmittance of the display panel 3 is controlled. In this situation, If the display modes of the transparent display module 31 includes the AR display mode and the VR display mode, and the user wants to switch the display mode of the transparent display module 31, the transparency of the transparent display module 31 can be changed by controlling the light transmittance of the light valve structure 32, so that the transparent display module 31 is in the environment required for the finally switched transparent display module 31.

Therefore, in one embodiment of the present disclosure, as shown in FIG. 3, the display drive sub-circuit 21 may include a switching sub-circuit 211. The output terminal of the brain control circuit 1 is connected with an input terminal of the switching sub-circuit 211, and an output terminal of the switching sub-circuit 211 is connected with the input terminals of the transmittance control sub-circuit 22 and the transparent display module 31. The switching sub-circuit 211 is configured to identify a mode switching control instruction to obtain an identification result, and to switch the display mode of the transparent display module 31 according to the identification result. The transmittance control sub-circuit 22 is further configured to control the light transmittance of the light valve structure 32 according to the identification result, so that the transparent display module 31 is in an environment required for the transparent display module 31 in the finally switched mode.

Specifically, when the user needs to switch the display mode of the transparent display module 31 to the AR display mode, the light transmittance of the light valve structure 32 should be relatively high, so that the transparency of the transparent display module 31 is relatively high to ensure that the user has the visualization of external scenery. When the user needs to switch the display mode of the transparent display module 31 to the VR display mode, the light valve structure 32 should be made opaque so as to ensure that the transparent display module 31 is opaque, thereby ensuring that the user is in a completely enclosed environment and better enjoys the visual experience brought by virtual reality.

In addition, the transmittance control sub-circuit 22 in the embodiments can control the light transmittance of the light valve structure 32 according to the received information, regardless of receiving the transmittance control instruction or receiving the identification result. As to how to specifically control the light transmittance of the light valve structure 32, it should be determined by the received information, and it will not be repeated here, please referring to the foregoing. Moreover, the control instructions generated by the brain control circuit 1 in the embodiments are generated one by one. Therefore, the transmittance control sub-circuit 22 in the embodiments receives either the transmittance control instruction or the identification result, and there is no problem of mutual influence.

In order to enable the user to experience a better viewing effect, as shown in FIG. 3, the output terminal of the switching sub-circuit 211 in the above embodiments may also be connected with the input terminal of the deflection adjustment component 43 so that the deflection adjustment component 43 can control the visor frame 42 or the rotating shaft 40 according to the identification result to ensure that the angle between the display surface of the transparent display module 31 and the user's line of sight forms the best viewing angle, and hence the user may experience the better viewing effect.

It will be noted that the deflection adjustment component 43 in the embodiments can adjust the visor frame 42 or the rotating shaft 40 according to the received information, irrespective of receiving the adjustment control instruction or receiving the identification result. As to how to adjust the visor frame 42 or the rotating shaft 40 specifically, it should be determined by the received information, which will not be repeated herein, and please referring to the foregoing.

In addition, the control instructions generated by the brain control circuit 1 in the embodiments are generated one by one, and thus the deflection adjustment component 43 in the embodiments receives either the adjustment control instruction or the identification result, and there is no problem of mutual influence.

In order to ensure the cruising ability of the brain-controlled wearable display device provided in the embodiments, please refer to FIG. 5, the brain-controlled wearable display device provided in the embodiments further includes a solar cell 5 for supplying power to the brain control circuit 1, the display control circuit 2 and the display panel 3, and the solar cell 5 is provided on an outer surface of the hat-type body 41 to ensure that the solar cell 5 receives sunlight at any time in a sunny region, so that the solar energy may be converted into electrical energy. In this way, when the brain control circuit 1, the display control circuit 2 and the display panel 3 have insufficient power, the solar cell 5 may supply the power to the brain control circuit 1, the display control circuit 2 and the display panel 3, so that the single use time of the brain-controlled wearable display device is greatly increased, thereby improving the cruising ability of the brain-controlled wearable display device. Of course, the solar cell 5 in the embodiments can also supply the power to, for example, the deflection adjustment component 43, and is not limited to supply the power to the brain control circuit 1, the display control circuit 2 and the display panel 3.

Figure 4:
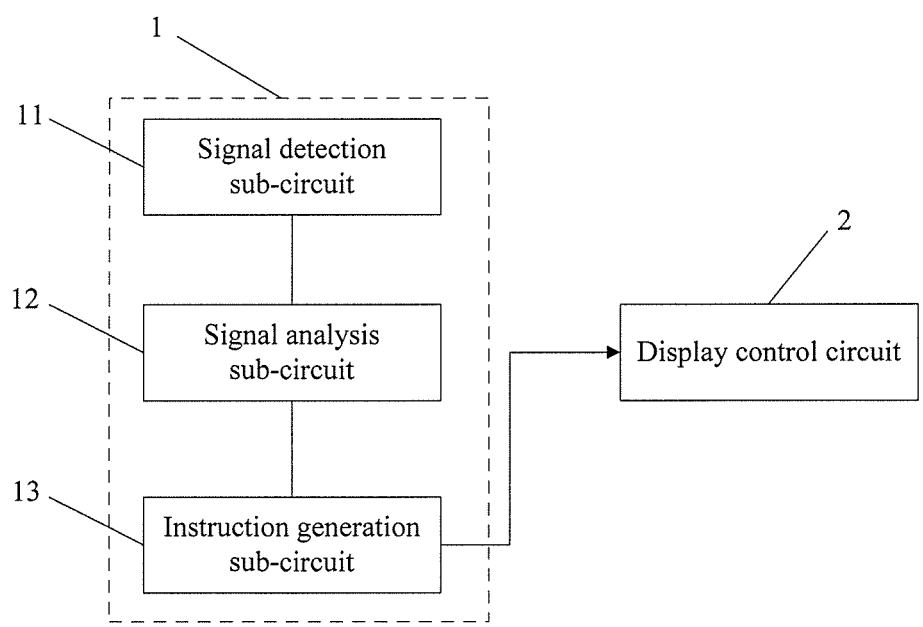
FIG. 4 is a structural block diagram of a brain control circuit provided by an embodiment of the present disclosure.

In addition, referring to FIG. 4, the brain control circuit 1 in the above embodiments includes a signal detection sub-circuit 11, a signal analysis sub-circuit 12 and an instruction generation sub-circuit 13. An output terminal of the signal detection sub-circuit 11 is connected to an input terminal of the instruction generation sub-circuit 13 via the signal analysis sub-circuit 12, and an output terminal of the instruction generation sub-circuit 13 is connected with the input terminal of the display control circuit 2. The signal detection sub-circuit 11 is configured to detect a brain wave signal, and the signal analysis sub-circuit 12 is configured to analyze the brain wave signal to obtain brain wave expression information. The instruction generation sub-circuit 13 is configured to generate a control instruction according to the brain wave expression information.

As shown in FIG. 5, the signal detection sub-circuit 11 generally includes a brain electrode 111 and a grounding electrode 112 configured to contact with an ear. The brain electrode 111 is provided at the hat-type body 41, and both the brain electrode 41 and the grounding electrode 112 are electrically connected with the input terminal of the signal analysis sub-circuit 12. Of course, the brain electrode 111 may be provided on the visor frame 42. However, when the display mode of the display panel 3 is the AR display mode, since the display performed by the display panel 3 in the AR display mode is an enhanced reality display based on a real-world scenery, if the brain electrode 111 is provided on the visor frame 42, it will affect the user's observation of the real-world scenery, and thus the enhanced reality display function of the display panel 3 in the AR display mode may not be used normally.

In order to enable the brain electrode 111 to better collect the brain wave signal, as shown in FIG. 5, the brain electrode 111 may be provided on a portion of the hat-type body 41 in contact with the front forehead, so that the brain electrode 111 may be ensured to accurately detect the brain wave signal in time. In addition, since the brain electrode 111 is provided on the portion of the hat-type body 41 in contact with the front forehead, which corresponds to that the brain electrode 111 is provided on the inside of hat-type body 41 to prevent the brain electrode 111 from being exposed, so that the hat-type body 41 may protect the brain electrode 111. Of course, this also improves the aesthetics of the brain-controlled wearable display device.

The contact of the grounding electrode 112 with the ear can be achieved in the following three methods, and of course can be achieved by other methods. In the first method, the grounding electrode 112 is integrated in an earphone. In this way, when the earphone is used, not only the sound brought by the earphone may be enjoyed, but also the grounding electrode 112 may be conveniently brought into contact with the ear to achieve the grounding function thereof. In the second method, the grounding electrode 112 is a hook-shaped grounding electrode which is configured to be hung on the ear. In the third method, the grounding electrode 112 is a clamp-type grounding electrode which is configured to clamp on the ear. Relative to the third method in which the grounding electrode 112 is designed as the clamp-type grounding electrode, in the second method in which the grounding electrode 112 is designed as a hook-shaped grounding electrode, when the hook-shaped grounding electrode is in contact with the ear, the user does not feel uncomfortable.

It will be emphasized that the top of the hat-type body 41 can has a closed structure or an open structure. If the top of the hat-type body 41 has the open structure, in this case, the solar cell 5 is provided on the hat-type body 41, and the solar cell 5 can be defined to seal an opening portion of the hat-type body 41 at the top of the hat-type body. In this way, the solar cell 5 may not only supply the power to the brain control circuit 1, the display control circuit 2, and the display panel 3 for a long period of time, but also may seal the opening portion of the hat-type body 41 to protect the head.

Considering that an outer surface of the hat-type body 41 does not have a conventional plate-like structure but an irregular curved surface structure, a rigid solar cell is formed into a shape that matches the structure of the outer surface of the hat-type body 41 and thus can fix the rigid solar cell on the outer surface of the hat-type body 41 very well. Moreover, when the user uses the brain-controlled wearable display device, the user's head is always in motion, causing the rigid solar battery 5 to undergo a certain bending. In this case, a problem of damage to the rigid solar cell may easily occur. Therefore, the solar cell 5 in the embodiments is preferably a flexible solar cell. In this way, not only the solar cell 5 may be manufactured according to the structure of the outer surface of the hat-type body 41, but also the solar cell 5 may utilize the flexibility of the solar cell 5 when the user moves his head, so that the solar cell 5 follows the user's head and changes the shape thereof according to the motion of the head, thereby reducing the possibility of damaging the solar cell 5.

Optionally, the flexible solar cell is an inorganic semiconductor solar cell, an organic solar cell, an inorganic-organic hybrid solar cell, or a dye-sensitized solar cell. Of course, the flexible solar cell can have other structures.

Referring to FIG. 1 and FIG. 6, an embodiment of the present disclosure further provides a brain-controlled display method applied to the brain-controlled wearable display device provided in the above embodiments, and the brain-controlled display method includes the following steps.

In S1, the brain control circuit 1 generates a control instruction according to a brain wave.

In S2, the display control circuit 2 controls the display panel 3 according to the control instruction.

The beneficial effects of the brain-controlled display method provided in the embodiments of the present disclosure are the same as those of the brain-controlled display method provided in the above embodiments, and will not be repeated here.

Figure 7:
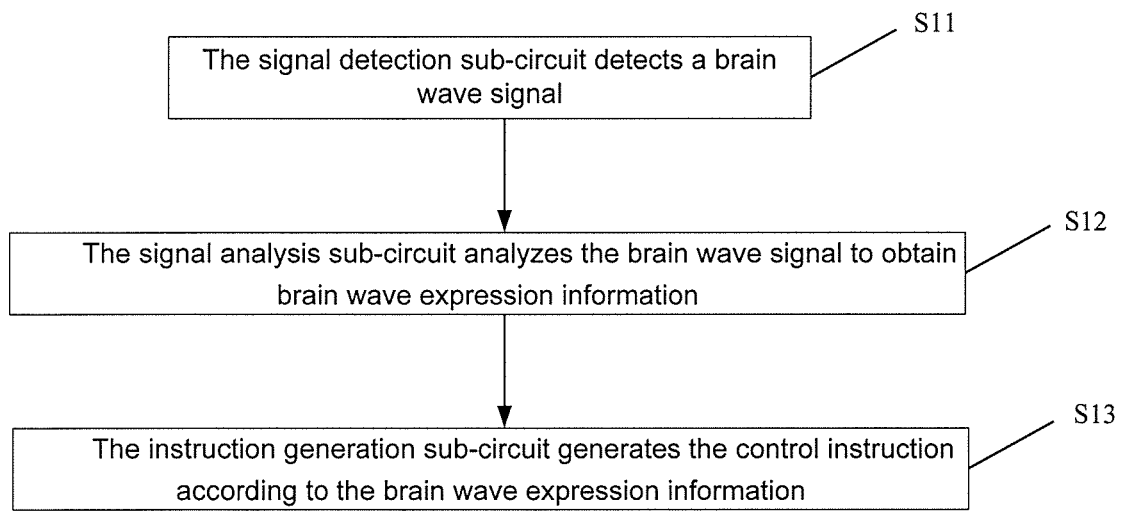
FIG. 7 is a flowchart of controlling a transparent display module by a display drive sub-circuit according to a display control instruction provided by an embodiment of the present disclosure.

It will be understood that, referring to FIGS. 4 and 7, the brain control circuit 1 in the embodiments includes the signal detection sub-circuit 11, the signal analysis sub-circuit 12 and the instruction generation sub-circuit 13. The output terminal of the signal detection sub-circuit 11 is connected to the input terminal of the instruction generation sub-circuit 13 via the signal analysis sub-circuit 12, and the output terminal of the instruction generation sub-circuit 13 is connected with the input terminal of the display control circuit 2.

Based on the above description, the step that the brain control circuit 1 generates the control instruction according to the brain wave includes the following steps.

In S11, the signal detection sub-circuit 11 detects a brain wave signal.

In S12, the signal analysis sub-circuit 12 analyzes the brain wave signal to obtain brain wave expression information.

In S13, the instruction generation sub-circuit 13 generates the control instruction according to the brain wave expression information.

As shown in FIGS. 3 and 5, in the brain-controlled wearable display device of the embodiments, the display panel 3 includes the transparent display module 31 and the light valve structure 32 disposed at a surface of the transparent display module away from the display surface of the transparent display module. The display control circuit 2 includes the display drive sub-circuit 21 and the transmittance control sub-circuit 22. The output terminal of the brain control circuit 1 is connected with the input terminal of the display drive sub-circuit 21 and the input terminal of the transmittance control sub-circuit 22, and the output terminal of the display drive sub-circuit 21 is connected with the input terminal of the transparent display module 31. The output terminal of the transmittance control sub-circuit 22 is connected with the input terminal of the light valve structure 32. Under this structure, the step that the display control circuit 2 controls the display panel 3 according to the control instruction includes the following cases.

The control instruction includes the display control instruction, and the display drive sub-circuit 21 controls the transparent display module according to the display control instruction.

The control instruction includes the transmittance control instruction, the transmittance control sub-circuit 22 controls the light transmittance of the light valve structure according to the transmittance control instruction.

Figure 8:
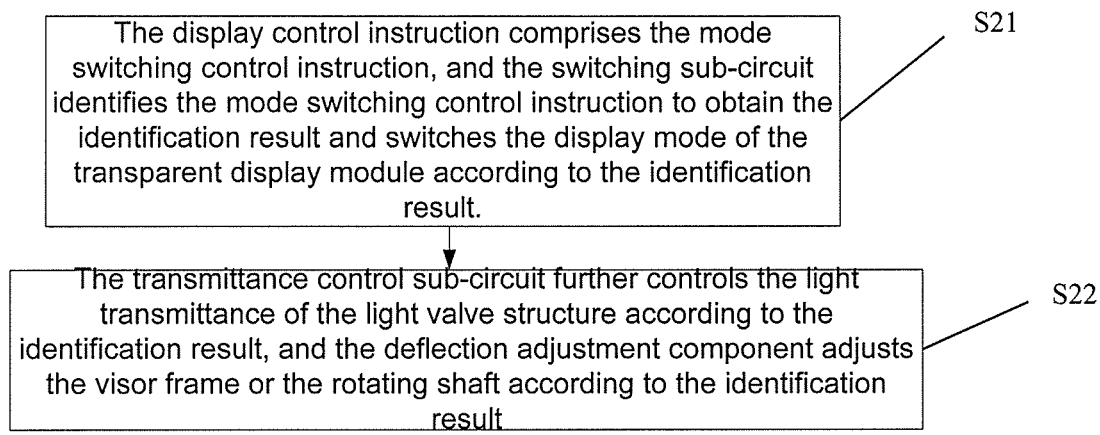
FIG. 8 is a specific flowchart of controlling a transparent display module by a display drive sub-circuit according to a display control instruction provided by another embodiment of the present disclosure.

Further, as shown in FIGS. 2 and 5, if the display modes of the transparent display module 31 include the AR display mode and the VR display mode, the display drive sub-circuit 21 includes the switching sub-circuit 211, and the visor frame 42 or the rotating shaft 40 is provided with the deflection adjustment component 43. The output terminal of the brain control circuit 1 is connected with the input terminal of the switching sub-circuit 211, and the output terminal of the switching sub-circuit 211 is connected with the input terminal of the transmittance control sub-circuit 22, the input terminal of the deflection adjustment component 43 and the input terminal of the transparent display module 31. Based on this, as shown in FIG. 8, the step that the display drive sub-circuit 21 controls the transparent display module according to the display control instruction includes the following steps.

In S21, the display control instruction includes the mode switching control instruction, and the switching sub-circuit 211 identifies the mode switching control instruction to obtain the identification result and switches the display mode of the transparent display module 31 according to the identification result.

In S22, the transmittance control sub-circuit 22 further controls the light transmittance of the light valve structure 32 according to the identification result, and the deflection adjustment component 43 adjusts the visor frame 42 or the rotating shaft 40 according to the identification result.

It will be noted that the display control instruction may also be the brightness control instruction and/or the switch control instruction. The display drive sub-circuit 21 includes the switch control sub-circuit 212 and/or the brightness control sub-circuit 213. Based on this, the step that the display drive sub-circuit 21 controls the transparent display module according to the display control instruction includes the following step.

The display control instruction includes the brightness control instruction so that the brightness control sub-circuit 213 adjusts the display brightness of the display panel according to the brightness control instruction, and/or, the display control instruction includes the switch control instruction so that the switch control sub-circuit 212 turns on or turns off the transparent display module according to the switch control instruction.

In the above description of the embodiments, a particular feature, structure, material, or characteristic may be combined in any suitable manner in any one or more of the embodiments or examples.

The foregoing descriptions are merely specific embodiments of the present disclosure, but the protection scope of the present disclosure is not limited thereto. Any variation or replacement easily conceivable by those skilled in the art in the technical scope disclosed by the present disclosure shall fall in the protection scope of the present disclosure. Therefore, the protection scope of the present disclosure should be subject to the protection scope of the claims.

What is claimed is:

1. A brain-controlled wearable display device, comprising a display panel, a display control circuit, and a brain control circuit connected with the display control circuit, wherein
the brain control circuit is configured to generate a control instruction according to a brain wave;
the display control circuit is configured to control the display panel according to the control instruction; the display control circuit comprises a display drive sub-circuit and a transmittance control sub-circuit; an output terminal of the brain control circuit is connected with an input terminal of the display drive sub-circuit and an input terminal of the transmittance control sub-circuit,
the display panel comprises a transparent display module and a light valve structure disposed at a surface of the transparent display module away from a display surface of the transparent display module; an output terminal of the display drive sub-circuit is connected with an input terminal of the transparent display module, an output terminal of the transmittance control sub-circuit is connected with an input terminal of the light valve structure;

the control instruction comprises a display control instruction, and the display drive sub-circuit is configured to control the transparent display module according to the display control instruction; and/or, the control instruction comprises a transmittance control instruction, and the transmittance control sub-circuit is configured to control a light transmittance of the light valve structure according to the transmittance control instruction;

wherein the brain-controlled wearable display device further comprises a hat-type body and a visor frame, the display panel is disposed on the visor frame, and the display control circuit and the brain control circuit are both provided on the hat-type body; and a rotating shaft is provided on the hat-type body, the visor frame is movably connected to the rotating shaft; the visor frame or the rotating shaft is provided with a deflection adjustment component, and the deflection adjustment component is configured to adjust the visor frame or the rotating shaft to control a deflection of the visor frame relative to the hat-type body.

2. The brain-controlled wearable display device according to claim 1, wherein the display drive sub-circuit comprises a switching sub-circuit, the output terminal of the brain control circuit is connected with an input terminal of the switching sub-circuit, an output terminal of the switching sub-circuit is connected with the input terminal of the transmittance control sub-circuit and the input terminal of the transparent display module; display modes of the transparent display module comprises an AR display mode and a VR display mode; the display control instruction comprises a mode switching control instruction through which a display mode of the transparent display module is switched into the AR display mode or the VR display mode;

the switching sub-circuit is configured to identify the mode switching control instruction to obtain an identification result, and to switch a display mode of the transparent display module according to the identification result;

the transmittance control sub-circuit is further configured to control the light transmittance of the light valve structure according to the identification result.

3. The brain-controlled wearable display device according to claim 1, wherein the output terminal of the brain control circuit is connected with an input terminal of the deflection adjustment component;

the control instruction comprises an adjustment control instruction, and the deflection adjustment component is configured to adjust the visor frame or the rotating shaft according to the adjustment control instruction.

4. The brain-controlled wearable display device according to claim 1, wherein the display control circuit comprises a switching sub-circuit, the output terminal of the brain control circuit is connected with an input terminal of the switching sub-circuit, an output terminal of the switching sub-circuit is connected with an input terminal of the deflection adjustment component, the control instruction comprises a mode switching control instruction, the switching sub-circuit is configured to identify the mode switching control instruction to obtain an identification result; and the deflection adjustment component is configured to adjust the visor frame or the rotating shaft according to the identification result.

5. The brain-controlled wearable display device according to claim 1, wherein the display drive sub-circuit comprises a brightness control sub-circuit; the output terminal of the brain control circuit is connected with an input terminal of the brightness control sub-circuit, and an output terminal of the brightness control sub-circuit is connected with the transparent display module;

the display control instruction comprises a brightness control instruction, and the brightness control sub-circuit is configured to adjust a display brightness of the transparent display module according to the brightness control instruction.

6. The brain-controlled wearable display device according to claim 1, wherein the display drive sub-circuit comprises a switch control sub-circuit; the output terminal of the brain control circuit is connected with an input terminal of the switch control sub-circuit, and an output terminal of the switch control sub-circuit is connected with the transparent display module;

the display control instruction comprises a switch control instruction, and the switch control sub-circuit is configured to turn on or turn off the transparent display module according to the switch control instruction.

7. The brain-controlled wearable display device according to claim 1, wherein the brain control circuit comprises a signal detection sub-circuit, a signal analysis sub-circuit and an instruction generation sub-circuit which are provided in the hat-type body; an output terminal of the signal detection sub-circuit is connected to an input terminal of the instruction generation sub-circuit via the signal analysis sub-circuit; an output terminal of the instruction generation sub-circuit is connected with an input terminal of the display control circuit;

the signal detection sub-circuit is configured to detect a brain wave signal;

the signal analysis sub-circuit is configured to analyze the brain wave signal to obtain brain wave expression information; and the instruction generation sub-circuit is configured to generate a control instruction according to the brain wave expression information.

8. The brain-controlled wearable display device according to claim 7, wherein the signal detection sub-circuit comprises a brain electrode and a grounding electrode configured to contact with an ear; the brain electrode is provided on the hat-type body, the brain electrode and the grounding electrode are electrically connected with an input terminal of the signal analysis sub-circuit.

9. The brain-controlled wearable display device according to claim 1, wherein the brain-controlled wearable display device further comprises a solar cell configured to provide power to the display control circuit, the display panel and the brain control circuit, and the solar cell is provided on an outer surface of the hat-type body.

10. A brain-controlled display method applied to the brain-controlled wearable display device according to claim 1, comprising:

generating, by the brain control circuit, the control instruction according to a brain wave; and controlling, by the display control circuit, the display panel according to the control instruction, wherein the brain control circuit comprises a signal detection sub-circuit, a signal analysis sub-circuit and an instruction generation sub-circuit; an output terminal of the signal detection sub-circuit is connected to an input terminal of the instruction generation sub-circuit via the signal analysis sub-circuit; an output terminal of the instruction generation sub-circuit is connected with an input terminal of the display control circuit; generating, by the brain control circuit, the control instruction according to the brain brave wave comprises:

detecting, by the signal detection sub-circuit, a brain wave signal;

analyzing, by the signal analysis sub-circuit, the brain wave signal to obtain brain wave expression information; and generating, by the instruction generation sub-circuit, the control instruction according to the brain wave expression information.

11. The brain-controlled display method according to claim 10, wherein controlling, by the display control circuit, the display panel according to the control instruction comprises:

controlling, by the display drive sub-circuit, the transparent display module according to a display control instruction included in the control instruction; and/or, controlling, by the transmittance control sub-circuit, a light transmittance of the light valve structure according to a transmittance control instruction included in the control instruction.

12. The brain-controlled display method according to claim 11, wherein the display drive sub-circuit comprises a switching sub-circuit, the visor frame or the rotating shaft is provided with a deflection adjustment component, an output terminal of the switching sub-circuit is connected with the input terminal of the transmittance control sub-circuit, an input terminal of the transparent display module and an input terminal of the deflection adjustment component; display modes of the transparent display module comprises an AR display mode and a VR display mode;

controlling, by the display drive sub-circuit, the transparent display module according to the display control instruction comprises:

identifying, by the switching sub-circuit, a mode switching control instruction included in the display control instruction, to obtain an identification result, and switching, by the switching sub-circuit, a display mode of the transparent display module according to the identification result;

controlling, further by the transmittance control sub-circuit, the light transmittance of the light valve structure according to the identification result;

adjusting, by the deflection adjustment component, the visor frame or the rotating shaft according to the identification result.

13. The brain-controlled display method according to claim 11, wherein the display drive sub-circuit comprises a brightness control sub-circuit and/or a switch control sub-circuit; the output terminal of the brain control circuit is connected with an input terminal of the brightness control sub-circuit and/or an input terminal of the switch control sub-circuit, an output terminal of the brightness control sub-circuit and/or an output terminal of the switch control sub-circuit are connected with the transparent display module;

controlling, by the display drive sub-circuit, the transparent display module according to the display control instruction comprises:

adjusting, by the brightness control sub-circuit, a display brightness of the display panel according to a brightness control instruction included in the display control instruction; and/or, turning on or turning off, by the switch control sub-circuit, the transparent display module according to a switch control instruction included in the display control instruction.

* * * * *